US011877155B2

(12) United States Patent
Jiang (10) Patent No.: US 11,877,155 B2
(45) Date of Patent: Jan. 16, 2024

(54) METHOD OF PERFORMING INTEGRITY VERIFICATION ON DOWNLINK DATA OF DRB AND REPORTING INFORMATION, USER EQUIPMENT AND COMPUTER READABLE STORAGE MEDIUM (71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 771 days.

(21) Appl. No.: 17/017,602

(22) Filed: Sep. 10, 2020

(65) Prior Publication Data
US 2020/0413263 A1 Dec. 31, 2020

Related U.S. Application Data (63) Continuation of application No. PCT/CN2018/080950, filed on Mar. 28, 2018.

(51) Int. Cl.
H04L 9/40 (2022.01)
H04L 29/06 (2006.01)
(Continued)

(52) U.S. Cl.
CPC ........... *H04W 12/106* (2021.01); *H04W 4/02* (2013.01); *H04W 24/10* (2013.01); *H04W 76/19* (2018.02);
(Continued)

(58) Field of Classification Search
CPC ... H04W 12/106; H04W 76/19; H04W 72/21; H04W 4/02; H04W 24/10
(Continued)

(56) References Cited

U.S. PATENT DOCUMENTS 10,110,282 B2 * 10/2018 Zhang .................... H04B 7/024
2013/0148490 A1 6/2013 Yi et al.
(Continued)

FOREIGN PATENT DOCUMENTS

CN 102142942 A 8/2011
CN 102300335 A 12/2011
(Continued)

OTHER PUBLICATIONS

First Office Action and Search Report Issued in Chinese Application No. 2018800005321 dated May 19, 2020 with English translation, (25p).
(Continued)

Primary Examiner — Haresh N Patel
(74) Attorney, Agent, or Firm — Arch & Lake LLP (57) ABSTRACT The present disclosure relates to a method and apparatus for reporting information, user equipment, and a computer readable storage medium. In the present disclosure, the method of reporting information includes: receiving downlink data of a data radio bearer (DRB) enabled with an integrity protection function and performing an integrity verification on the downlink data of the DRB; and triggering an integrity-verification-failure-related-information reporting in response to that the integrity verification fails, where the integrity-verification-failure-related-information includes one or more of parameters: location information of the UE, a failure indication type of IntegrityVerification-Failure, indication information of a triggering way to trigger the integrity-verification-failure-related-information reporting, and a number of integrity verification failures.

13 Claims, 7 Drawing Sheets (51) Int. Cl.
- *H04W 12/106* (2021.01)
- *H04W 76/19* (2018.01)
- *H04W 4/02* (2018.01)
- *H04W 24/10* (2009.01)
- *H04W 36/00* (2009.01)
- *H04W 72/21* (2023.01)

(52) U.S. Cl.
CPC ........ *H04W 36/0055* (2013.01); *H04W 72/21* (2023.01)

(58) Field of Classification Search
USPC ............................................................. 726/3
See application file for complete search history.

(56) References Cited

U.S. PATENT DOCUMENTS

| | | | | |
|---|---|---|---|---|
| 2014/0238110 | A1* | 8/2014 | Williams | G01M 3/2846 73/40 |
| 2015/0281278 | A1* | 10/2015 | Gooding | H04L 63/20 726/1 |
| 2017/0024238 | A1* | 1/2017 | Hiremane | G06F 21/575 |
| 2017/0118680 | A1 | 4/2017 | Zhu et al. | |
| 2018/0018216 | A1* | 1/2018 | Halford | H04L 1/0061 |
| 2018/0260583 | A1* | 9/2018 | Doerner | H04L 69/40 |

FOREIGN PATENT DOCUMENTS

| | | | | |
|---|---|---|---|---|
| CN | 102379137 A | | 3/2012 | |
| CN | 102379137 B | | 9/2015 | |
| CN | 106470419 A | | 3/2017 | |
| JP | 6987964 B2 | * | 1/2022 | ........ H04W 28/0252 |
| KR | 102377138 B1 | * | 3/2022 | |
| WO | WO-2009155582 A2 | * | 12/2009 | ........... H04L 1/1607 |
| WO | WO-2019126954 A1 | * | 7/2019 | .......... H04W 52/365 |

OTHER PUBLICATIONS

International Search Report Issued in International Application No. PCT/CN2018/080950 dated Jan. 4, 2019 with English translation, (6p).

VIVO, "Behavior on DRB IP check failure", 3GPP TSG-RAN WG2 Meeting #100, Reno, USA, R2-1712755, Revision of R2-1710921/ 23, Nov. 27-Dec. 1, 2017, (3p).

VIVO, "Behavior on DRB IP check failure", 3GPP TSG-RAN WG2 NR Ad hoc 1801, Vancouver, Canada, R2-1800861, Revision of R2-1712755, Jan. 22-26, 2018, (3p).

ZTE Corporation, "DRB integrity check failure handling", 3GPP TSG-RAN WG2 Meeting #101, Athens, Greece, R2-1803967, Revision of R2-1802397, Feb. 26-Mar. 2, 2018, (4p).

OPPO, "Discussion on DRB IP failure handing and data recovery", 3GPP TSG-RAN2#101, Athens, Greece, R2-1801799, Revised based on R2-1800279, Feb. 26-Mar. 2, 2018, (5p).

VIVO, "Behavior on DRB IP check failure", 3GPP TSG-RAN WG2 #101, Reno, Athens, Greece, R2-1802077, Revision of R2-1800861, Feb. 26-Mar. 2, 2018, (5p).

* cited by examiner

METHOD OF PERFORMING INTEGRITY VERIFICATION ON DOWNLINK DATA OF DRB AND REPORTING INFORMATION, USER EQUIPMENT AND COMPUTER READABLE STORAGE MEDIUM

CROSS-REFERENCE TO RELATED APPLICATIONS

This application is a continuation of International Application No. PCT/CN2018/080950 filed on Mar. 28, 2018, which is incorporated herein by reference in its entirety for all purposes.

TECHNICAL FIELD

The present disclosure relates to the field of communication technology, and in particular, relates to a method and an apparatus for reporting information, user equipment, and a computer readable storage medium.

BACKGROUND

With the rapid development of wireless communication technology, Minimized Driving Test (MDT) technology has been introduced into Long Term Evolution (LTE) so as to help a network in troubleshooting. Both an idle state and a connected state are supported by the MDT technology. For user equipment (UE) in the connected state, the UE may be configured to report its location information together with a measurement report, which helps the network to acquire signal qualities at various positions. Meanwhile, the UE in the connected state is also configured to report its location information when a switching due to a radio link failure of a Master Cell Group (MCG) is failed.

In an LTE system, an integrity protection is performed only on a control plane, but in a new radio (NR) technology, an integrity protection function has been introduced on user plane data. However, an integrity verification on user plane data may fail, and how to operate after the failure is a technical problem to be solved.

SUMMARY

In view of this, the present application discloses a method and an apparatus for reporting information, user equipment, and a computer readable storage medium, so to realize that the UE in a network reports information concerning an integrity verification on user plane data which fails, thereby helping the network to locate problems.

According to a first aspect of the present disclosure, there is provided a method of reporting information, which is applicable to user equipment (UE). The method includes: receiving downlink data of a data radio bearer (DRB) enabled with an integrity protection function and performing an integrity verification on the downlink data of the DRB; and triggering an integrity-verification-failure-related-information reporting in response to that the integrity verification fails, where the integrity-verification-failure-related-information includes one or more of parameters: location information of the UE, a failure indication type of IntegrityVerificationFailure, indication information of a triggering way to trigger the integrity-verification-failure-related-information reporting, and a number of integrity verification failures.

According to a second aspect of the present disclosure, there is provided an apparatus for reporting information, which is applicable to user equipment (UE). The apparatus includes: a receiving and verifying module and a triggering and reporting module. The receiving and verifying module is configured to receive downlink data of a data radio bearer (DRB) enabled with an integrity protection function and perform an integrity verification on the downlink data of the DRB. The triggering and reporting module is configured to trigger an integrity-verification-failure-related-information reporting in response to that the integrity verification performed by the receiving and verifying module fails, where the integrity-verification-failure-related-information includes one or more of parameters: location information of the UE, a failure indication type of IntegrityVerificationFailure, indication information of a triggering way to trigger the integrity-verification-failure-related-information reporting, and a number of integrity verification failures.

According to a third aspect of the present disclosure, user equipment is provided and includes: a processor; and a memory for storing executable instructions by the processor. The processor is configured to: receive downlink data of a data radio bearer (DRB) enabled with an integrity protection function and perform an integrity verification on the downlink data of the DRB; and trigger an integrity-verification-failure-related-information reporting in response to that the integrity verification fails, where the integrity-verification-failure-related-information includes one or more of parameters: location information of the UE, a failure indication type of IntegrityVerificationFailure, indication information of a triggering way to trigger the integrity-verification-failure-related-information reporting, and a number of integrity verification failures.

According to a fourth aspect of the present disclosure, a computer readable storage medium is provided. The computer readable storage medium has computer instructions stored thereon, and when the instructions are executed by a processor, the steps of the method of reporting information described above are implemented.

It should be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

DETAILED DESCRIPTION OF THE EMBODIMENTS

Examples will be described in detail herein, with the illustrations thereof represented in the drawings. When the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

Figure 1:
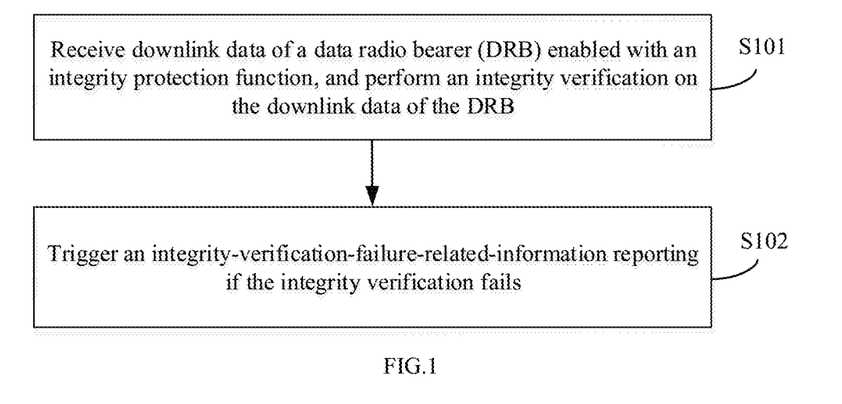
FIG. 1 is a flowchart illustrating a method of reporting information according to an example of the present disclosure.

FIG. 1 is a flowchart illustrating a method of reporting information according to an example of the present disclosure. This embodiment is described from a UE side. As shown in FIG. 1, the method of reporting information includes steps S101-S102.

At step S101, downlink data of a data radio bearer (DRB) enabled with an integrity protection function is received, and an integrity verification on the downlink data of the DRB is performed.

At step S102, an integrity-verification-failure-related-information reporting is triggered if the integrity verification fails, where the integrity-verification-failure-related-information may include but not be limited to one or more of the following information items: location information of the UE, a failure indication type of IntegrityVerificationFailure, indication information of a triggering way to trigger the integrity-verification-failure-related-information reporting, and a number of integrity verification failures.

In the above method, the triggering way to trigger the integrity-verification-failure-related-information reporting may include one or more of the following ways.

First triggering way: the integrity-verification-failure-related-information reporting is triggered if the number of integrity verification failures of the UE reaches a first preset number.

The first preset number is configured by the base station or negotiated through a current system.

Second triggering way: the integrity-verification-failure-related-information reporting is triggered if the number of integrity verification failures for the same DRB reaches a second preset number.

The second preset number is configured by the base station or negotiated through the current system, or the second preset number is configured for each UE or each DRB.

Third triggering way: the integrity-verification-failure-related-information reporting is triggered if the number of integrity verification failures of the UE reaches a third preset number within a first preset duration.

The third preset number and the first preset duration are configured by the base station or negotiated through the current system, or the third preset number and the first preset duration are configured for each UE.

Fourth triggering way: the integrity-verification-failure-related-information reporting is triggered if the number of integrity verification failures for the same DRB reaches a fourth preset number within a second preset duration.

The fourth preset number and the second preset duration are configured by the base station or negotiated through the current system, or the fourth preset number and the second preset duration are configured for each UE or each DRB.

It should be noted that the first preset number, the second preset number, the third preset number and the fourth preset number may be identical or different, and that the first preset duration and the second preset duration may be identical or different.

It can be seen that, in some embodiments, various triggering ways may be adopted to trigger the integrity-verification-failure-related-information reporting, and the triggering way is flexible.

Here, by receiving the downlink data of the DRB enabled with the integrity protection function, and performing the integrity verification on the downlink data of the DRB, and then triggering the integrity-verification-failure-related-information reporting if the integrity verification fails, it can be realized that the UE in a network reports the information concerning the integrity verification on user plane data which fails, thereby helping the network to locate problems.

Figure 2:
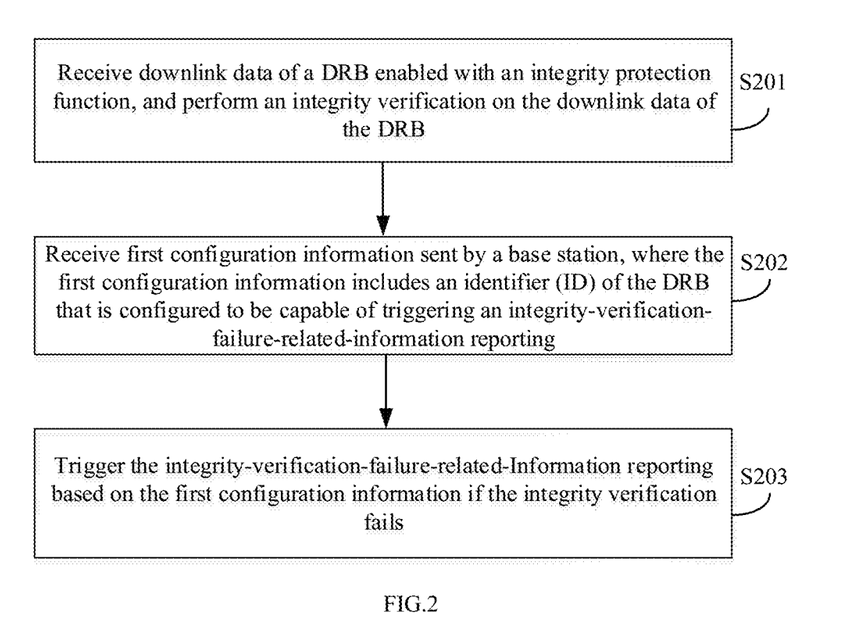
FIG. 2 is a flowchart illustrating another method of reporting information according to an example of the present disclosure.

FIG. 2 is a flowchart illustrating another method of reporting information according to an example of the present disclosure. As shown in FIG. 2, the method of reporting information includes steps S201-S203.

At step S201, downlink data of a DRB enabled with an integrity protection function is received, and an integrity verification on the downlink data of the DRB is performed.

At step S202, first configuration information sent by a base station is received, where the first configuration information includes an identifier (ID) of the DRB that is capable of triggering an integrity-verification-failure-related-information reporting.

At step S203, the integrity-verification-failure-related-information reporting is triggered based on the first configuration information if the integrity verification fails.

In the above method, the integrity-verification-failure-related-information may include but is not limited to one or more of the following information items: location information of the UE, a DRB ID, a failure indication type of IntegrityVerificationFailure, indication information of a triggering way to trigger the integrity-verification-failure-related-information reporting, and a number of integrity verification failures.

In the above method, the triggering way to trigger the integrity-verification-failure-related-information reporting based on the first configuration information may include one or more of the ways 1)-4) provided in the embodiment shown in FIG. 1, which will not be repeated here.

In some embodiments, by receiving the first configuration information including the DRB ID sent by the base station, with the DRB configured to be capable of triggering an integrity-verification-failure-related-information reporting, so that the UE can trigger the integrity-verification-failure-related-information reporting based on the first configuration information, which helps a network to locate problems.

Figure 3:
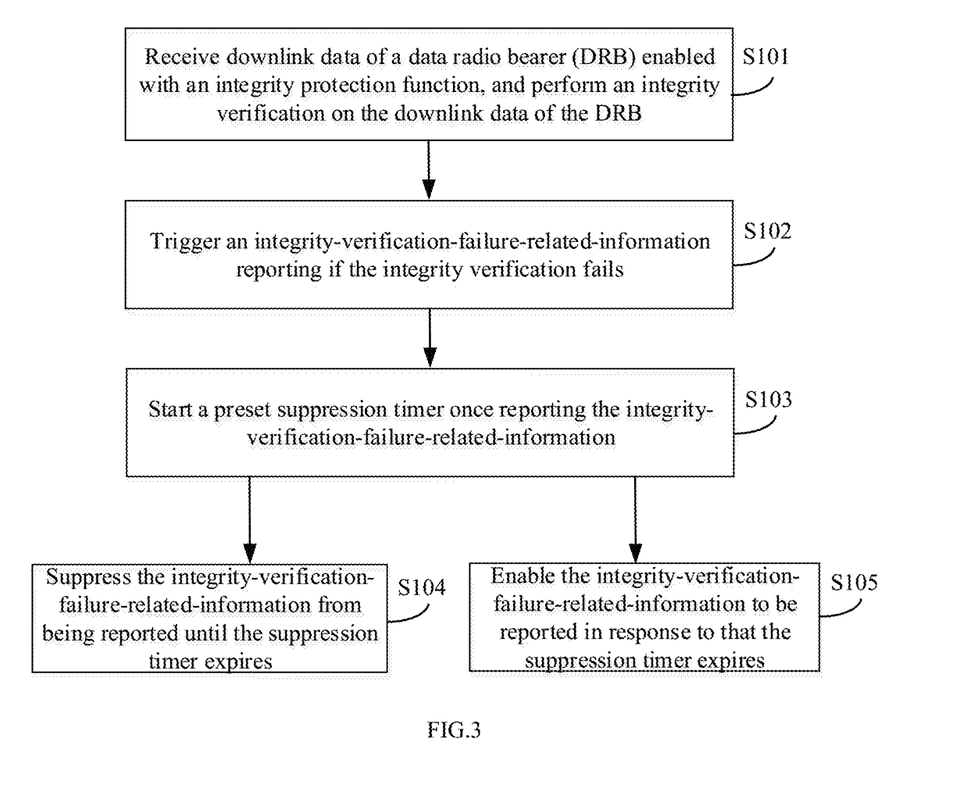
FIG. 3 is a flowchart illustrating another method of reporting information according to an example of the present disclosure.

FIG. 3 is a flowchart illustrating another method of reporting information according to an example of the present disclosure. As shown in FIG. 3, following step S102, the method may further include steps S103-S105.

At step S103, a preset suppression timer is started once reporting the integrity-verification-failure-related-information.

In this step, the suppression timer is configured by the base station or negotiated through the current system.

At step S104, the integrity-verification-failure-related-information is suppressed from being reported until the suppression timer expires.

At step S105, the integrity-verification-failure-related-information is enabled to be reported in response to that the suppression timer expires.

In some embodiments, by starting the preset suppression timer once the integrity-verification-failure-related-information is reported, suppressing the integrity-verification-failure-related-information from being reported until the suppression timer expires and enabling the integrity-verification-failure-related-information to be reported in response to that the suppression timer expires, the number of the reporting from the UE can be reduced, which decreases system energy consumption.

Figure 4:
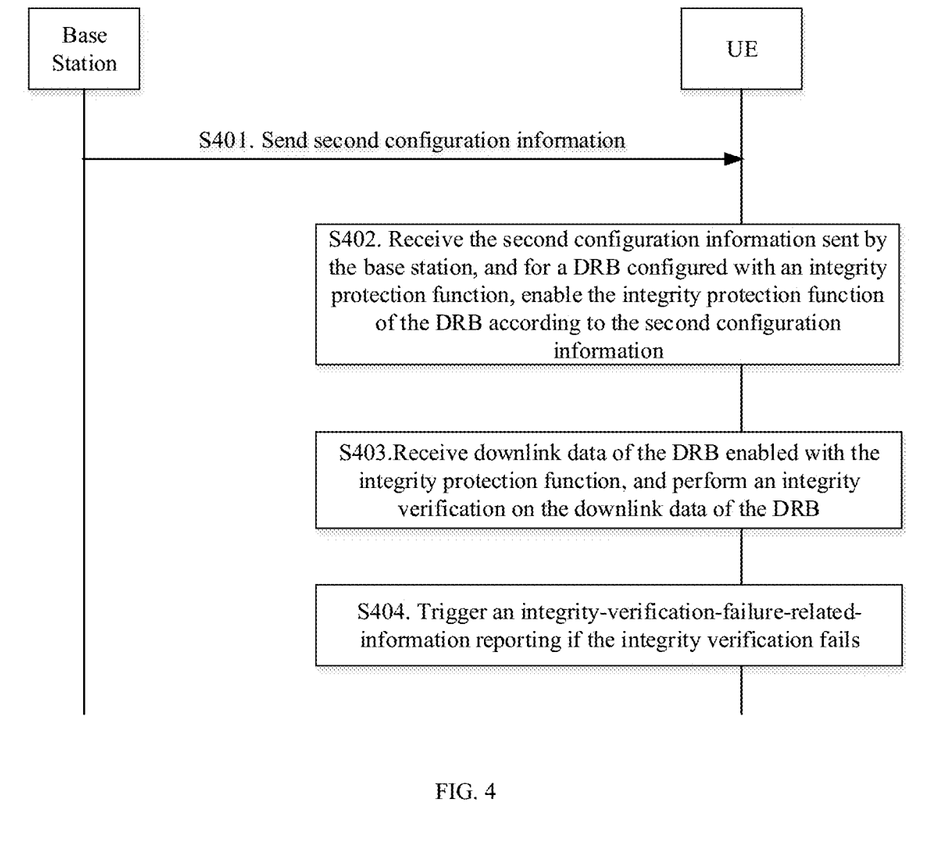
FIG. 4 is a signaling flowchart illustrating a method of reporting information according to an example of the present disclosure.

FIG. 4 is a signaling flowchart illustrating a method of reporting information according to an example of the present disclosure. As shown in FIG. 4, the method may include steps S401-S404.

At step S401, a base station sends second configuration information to a UE.

At step S402, the UE receives the second configuration information sent by the base station, and for a DRB configured with an integrity protection function, enables the integrity protection function of the DRB according to the second configuration information.

At step S403, the UE receives downlink data of the DRB enabled with the integrity protection function, and performs an integrity verification on the downlink data of the DRB.

At step S404, if the integrity verification fails, the UE triggers an integrity-verification-failure-related-information reporting.

In the above method, the integrity-verification-failure-related-information includes but is not limited to one or more of the following information items: location information of the UE, a DRB ID, a failure indication type of IntegrityVerificationFailure, indication information of a triggering way to trigger the integrity-verification-failure-related-information reporting, and a number of integrity verification failures.

In this embodiment, in response to receiving the integrity-verification-failure-related information reported by the UE, the base station may send the relevant information to a Trace Collection Entity (TCE), and then the data in the TCE may be processed by a special analysis platform. For example, a map showing the locations where the integrity verification fails is drawn, so that a security attack area can be located, and then it is possible to perform troubleshooting on site.

In some embodiments, via the interaction between the base station and the UE, the UE may trigger the integrity-verification-failure-related-information reporting if the integrity verification fails, so as to realize that the UE in a network reports the information concerning the integrity verification on user plane data which fails, thereby helping the network to locate problems.

Figure 5:
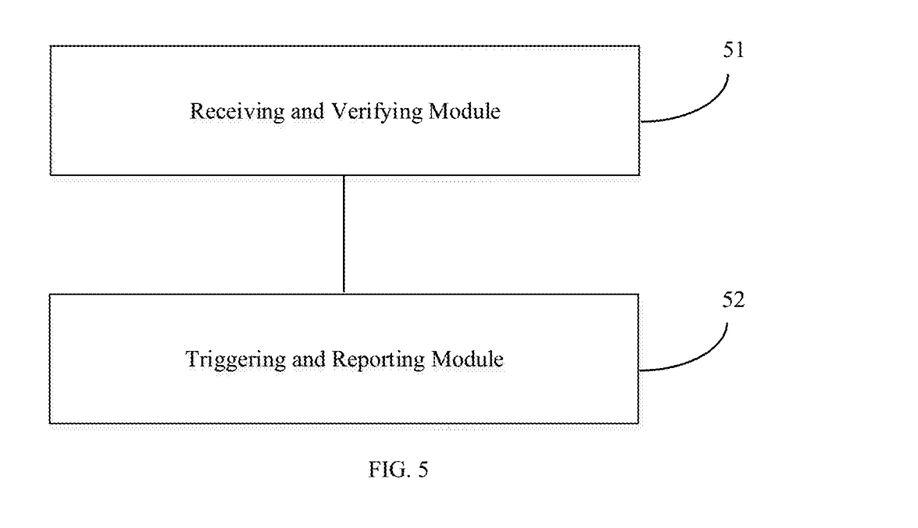
FIG. 5 is a block diagram illustrating an apparatus for reporting information according to an example.

FIG. 5 is a block diagram illustrating an apparatus for reporting information according to an example. The apparatus may be located in a UE. As shown in FIG. 5, the apparatus includes a receiving and verifying module 51 and a triggering and reporting module 52.

The receiving and verifying module 51 is configured to receive downlink data of a data radio bearer (DRB) enabled with an integrity protection function and perform an integrity verification on the downlink data of the DRB.

The triggering and reporting module 52 is configured to trigger an integrity-verification-failure-related-information reporting if the integrity verification performed by the receiving and verifying module 51 fails, where the integrity-verification-failure-related-information includes one or more of the following information items: location information of the UE, a failure indication type of IntegrityVerificationFailure, indication information of a triggering way to trigger the integrity-verification-failure-related-information reporting, and a number of integrity verification failures.

In some embodiments, by receiving the downlink data of the DRB enabled with the integrity protection function, and performing the integrity verification on the downlink data of the DRB, and then triggering the integrity-verification-failure-related-information reporting if the integrity verification fails, it can be realized that the UE in a network reports the information concerning the integrity verification on user plane data which fails, thereby helping the network to locate problems.

Figure 6:
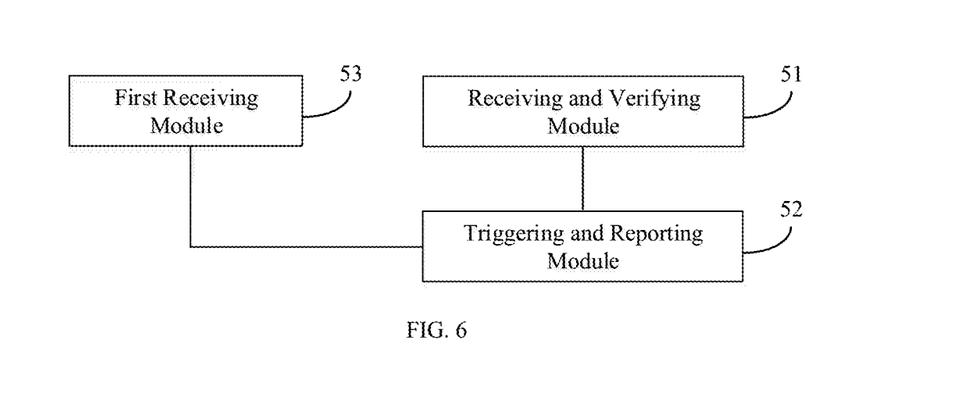
FIG. 6 is a block diagram illustrating another apparatus for reporting information according to an example.

FIG. 6 is a block diagram of another apparatus for reporting information according to an example. As shown in FIG. 6, on the basis of some embodiments shown in FIG. 5, the apparatus may further include: a first receiving module 53.

The first receiving module 53 is configured to receive first configuration information sent by a base station, where the first configuration information includes an identifier of the DRB that is capable of triggering the integrity-verification-failure-related-information reporting.

The triggering and reporting module 52 may be configured to trigger the integrity-verification-failure-related-information reporting based on the first configuration information received by the first receiving module 53.

In the above apparatus, the way for the triggering and reporting module 52 triggering the integrity-verification-failure-related-information reporting based on the first configuration information may include one or more of the ways 1)-4) provided in the embodiment shown in FIG. 1, which will not be repeated here.

In some embodiments, by receiving the first configuration information including the DRB ID sent by the base station, with the DRB configured to be capable of triggering the integrity-verification-failure-related-information reporting, so that the UE can trigger the integrity-verification-failure-related-information reporting based on the first configuration information, which helps the network to locate problems.

Figure 7:
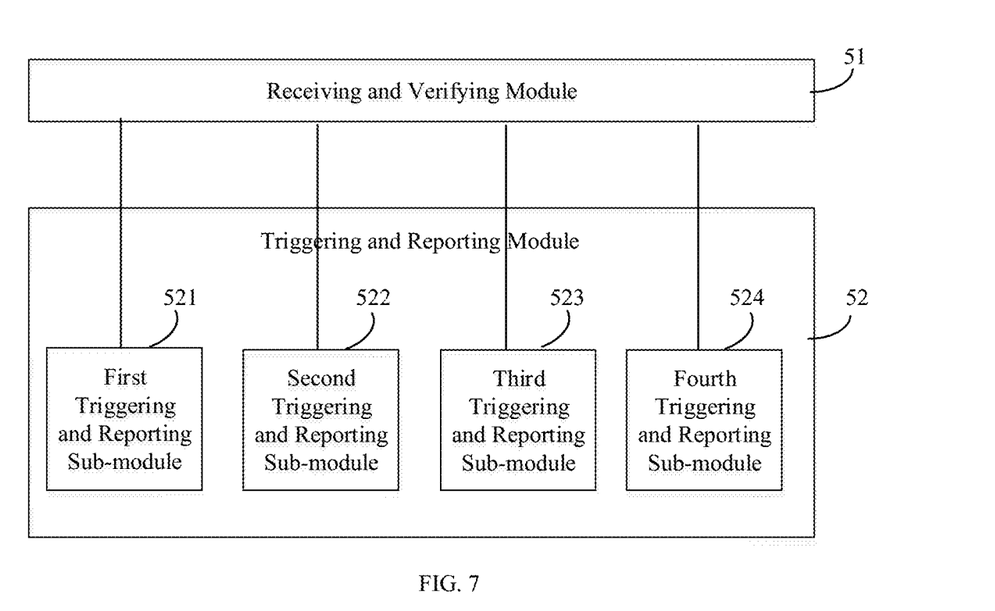
FIG. 7 is a block diagram illustrating another apparatus for reporting information according to an example.

FIG. 7 is a block diagram of another apparatus for reporting information according to an example. As shown in FIG. 7, on the basis of some embodiments shown in FIG. 5 or FIG. 6, the triggering and reporting module 52 may include one or more of the following sub-modules: a first triggering and reporting sub-module 521, a second triggering and reporting sub-module 522, a third triggering and reporting sub-module 523, and a fourth triggering and reporting sub-module 524.

The first triggering and reporting sub-module 521 is configured to trigger the integrity-verification-failure-related-information reporting when the number of integrity verification failures of the UE reaches a first preset number.

The first preset number is configured by the base station or negotiated through a current system.

The second triggering and reporting sub-module 522 is configured to trigger the integrity-verification-failure-related-information reporting when the number of integrity verification failures for the same DRB reaches a second preset number.

The second preset number is configured by the base station or negotiated through the current system, or the second preset number is configured for each UE or for each DRB.

The third triggering and reporting sub-module 523 is configured to trigger the integrity-verification-failure-related-information reporting when the number of integrity verification failures of the UE reaches a third preset number within a first preset duration.

The third preset number and the first preset duration are configured by the base station or negotiated through the current system, or the third preset number and the first preset duration are configured for each UE.

The fourth triggering and reporting sub-module 524 is configured to trigger the integrity-verification-failure-related-information reporting when the number of integrity verification failures for the same DRB reaches a fourth preset number within a second preset duration.

The fourth preset number and the second preset duration are configured by the base station or negotiated through the current system, or the fourth preset number and the second preset duration are configured for each UE or for each DRB.

It should be noted that the first preset number, the second preset number, the third preset number and the fourth preset number may be identical or different, and that the first preset duration and the second preset duration may be identical or different.

In some embodiments, various ways may be adopted to trigger the integrity-verification-failure-related-information reporting, and the triggering way is flexible.

Figure 8:
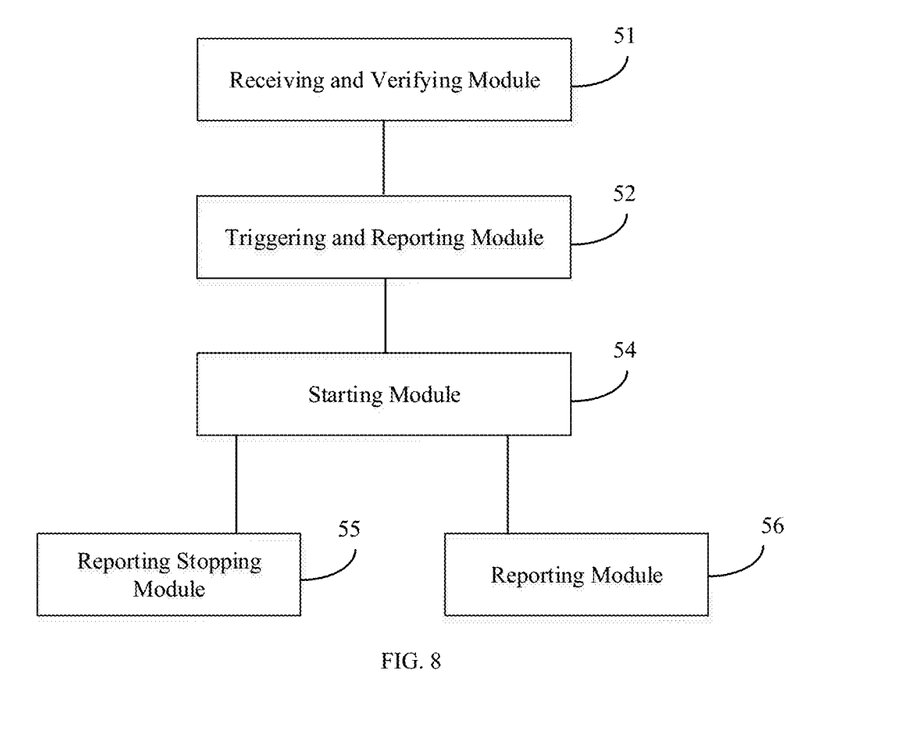
FIG. 8 is a block diagram illustrating another apparatus for reporting information according to an example.

FIG. 8 is a block diagram of another apparatus for reporting information according to an example. As shown in FIG. 8, based on some embodiments shown in FIG. 5, the apparatus may further include: a starting module 54, a reporting stopping module 55 and a reporting module 56.

The starting module 54 is configured to start a preset suppression timer once the triggering and reporting module 52 triggers the integrity-verification-failure-related-information reporting.

The suppression timer is configured by the base station or negotiated through the current system.

The reporting stopping module 55 is configured to suppress the integrity-verification-failure-related-information from being reported until the suppression timer started by the starting module 54 expires.

The reporting module 56 is configured to enable the integrity-verification-failure-related-information to be reported in response to that the suppression timer started by the starting module 54 expires.

In some embodiments, by starting the preset suppression timer once reporting the integrity-verification-failure-related-information, suppressing the integrity-verification-failure-related-information from being reported until the suppression timer expires, and enabling the integrity-verification-failure-related-information to be reported in response to that the suppression timer expires, the number of the reporting from the UE can be reduced, which decreases system energy consumption.

Figure 9:
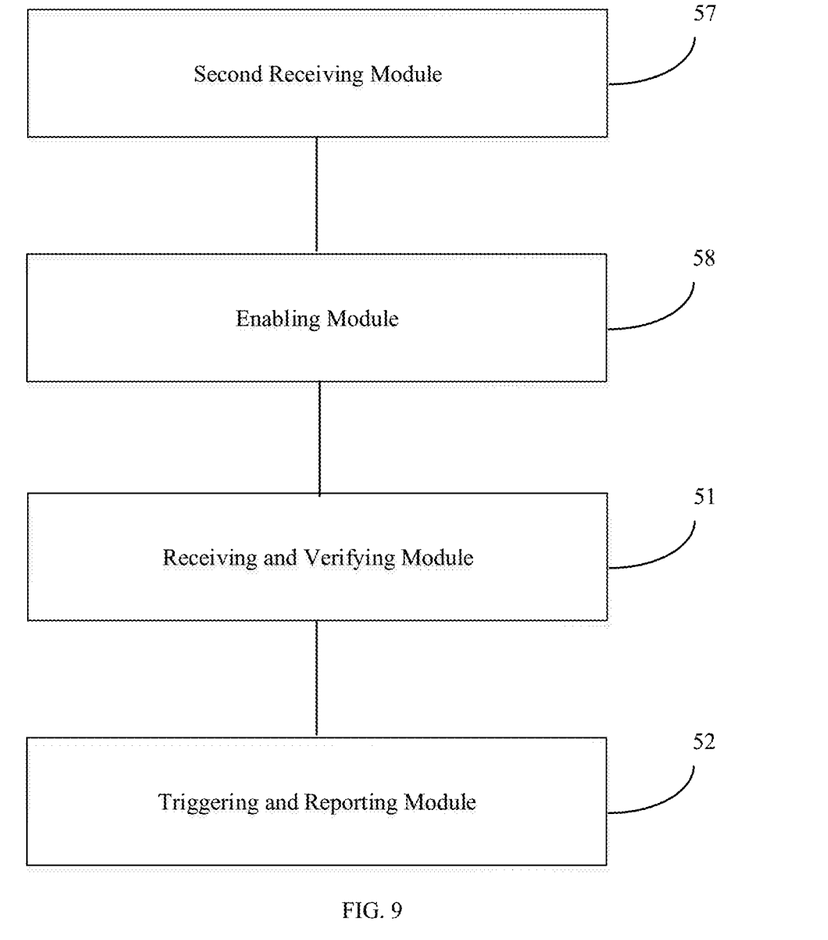
FIG. 9 is a block diagram illustrating another apparatus for reporting information according to an example.

FIG. 9 is a block diagram of another apparatus for reporting information according to an example. As shown in FIG. 9, on the basis of some embodiments shown in FIG. 5, the apparatus may further include: a second receiving module 57 and an enabling module 58.

The second receiving module 57 is configured to receive a second configuration information sent by the base station.

The enabling module 58 is configured to for a DRB configured with the integrity protection function, enable the integrity protection function of the DRB based on the second configuration information received by the second receiving module 57, so that the receiving and verifying module 51 receives the downlink data of the DRB enabled with the integrity protection function.

In this embodiment, in response to receiving the integrity-verification-failure-related-information reported by the UE, the base station may send the relevant information to a Trace Collection Entity (TCE), and then the data in the TCE may be processed by a special analysis platform. For example, a map showing the locations where the integrity verification fails is drawn, so that a security attack area can be located, and then it is possible to perform troubleshooting on site.

In some embodiments, via the interaction between the base station and the UE, the UE may trigger the integrity-verification-failure-related-information reporting if the integrity verification fails, so as to realize that the UE in a network reports the information concerning the integrity verification on user plane data which fails, thereby helping the network to locate problems.

Figure 10:
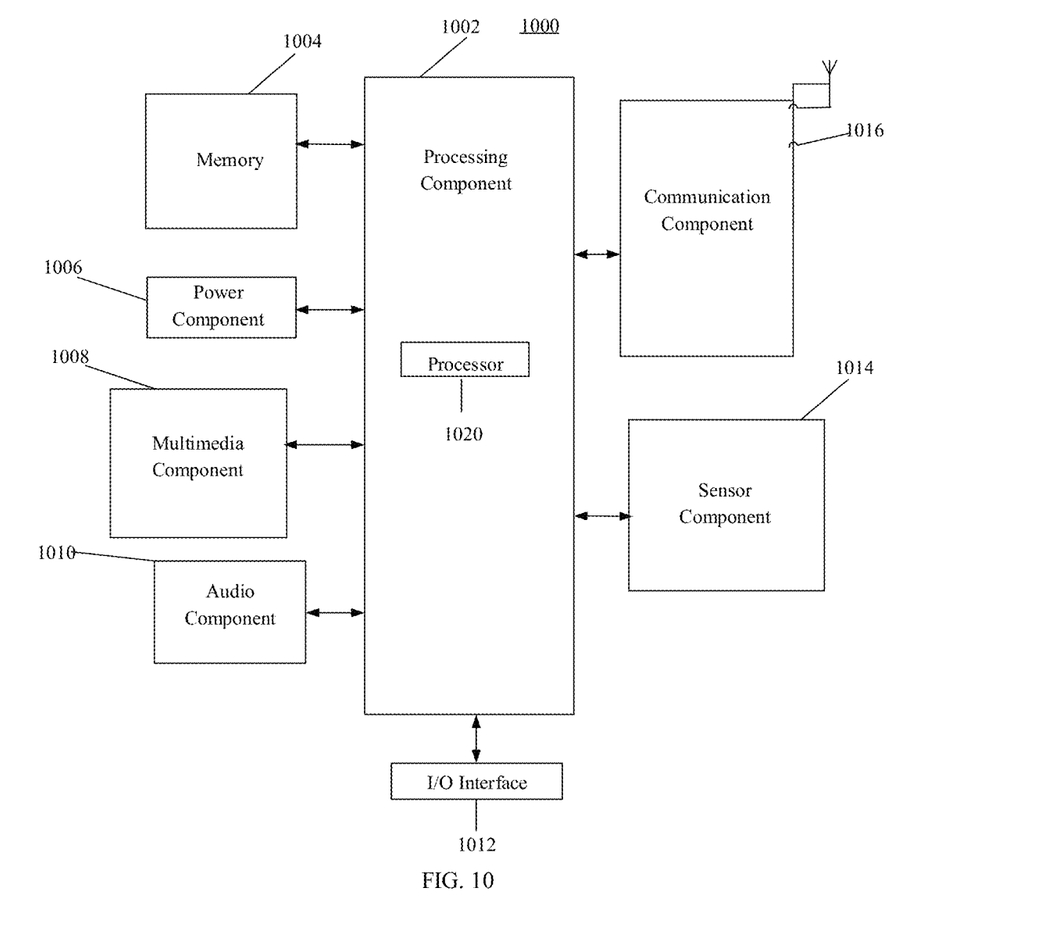
FIG. 10 is a block diagram applicable to an apparatus for reporting information illustrated according to an example.

FIG. 10 is a block diagram applicable to an apparatus for reporting information illustrated according to an example. For example, a device 1000 may be a mobile phone, a computer, a digital broadcasting terminal, a messaging device, a game console, a tablet device, a medical device, a fitness device, a personal digital assistant, or other user equipment.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls the overall operations of the device 1000, such as operations associated with display, telephone calls, data communications, camera operations, and recording operations. The processing element 1002 may include one or more processors 1020 to execute instructions to complete all or part of the steps of the above method. In addition, the processing component 1002 may include one or more modules to facilitate interaction between the processing component 1002 and other components. For example, the processing component 1002 may include a multimedia module to facilitate interaction between the multimedia component 1008 and the processing component 1002.

One of the processors 1020 in the processing component 1002 may be configured to:

receive downlink data of a data radio bearer (DRB) enabled with an integrity protection function and perform an integrity verification on the downlink data of the DRB; and trigger an integrity-verification-failure-related-information reporting if the integrity verification fails, where the integrity-verification-failure-related-information includes one or more of following parameters: location information of the UE, a failure indication type of IntegrityVerificationFailure, indication information of a triggering way to trigger the integrity-verification-failure-related-information reporting, and a number of integrity verification failures.

The memory 1004 is configured to store various types of data to support operation at the device 1000. Examples of such data include instructions for any application or method operating on the device 1000, contact data, phone book data, messages, pictures, videos, and the like. The memory 1004 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power component 1006 provides power to various components of the device 1000. The power component 1006 may include a power management system, one or more power sources, and other components associated with generating, managing, and distributing power for the device 1000.

The multimedia component 1008 includes a screen between the device 1000 and the user that provides an output interface. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure related to the touch or sliding operation. In some embodiments, the multimedia component 1008 includes a front camera and/or a rear camera. When the device 1000 is in an operation mode, such as a shooting mode or a video mode, the front camera and/or the rear camera may receive external multimedia data. Each front and rear camera can be a fixed optical lens system or have focal length and optical zooming capabilities.

The audio component 1010 is configured to output and/or input audio signals. For example, the audio component 1010 includes a microphone (MIC) that is configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The peripheral interface module may be a keyboard, a click wheel, a button, or the like. These buttons may include, but are not limited to, a home button, a volume button, a start button, and a lock button.

The sensor component 1014 includes one or more sensors for providing the device 1000 with status assessment in various aspects. For example, the sensor component 1014 can detect an open/closed state of the device 1000, a relative positioning of components, such as the display and keypad of the device 1000 and the sensor component 1014 can also detect a change in position of the device 1000 or a component of the device 1000, the presence or absence of user contact with the device 1000, orientation or acceleration/deceleration of the device 1000, and temperature change of the device 1000. The sensor component 1014 may include a proximity sensor configured to detect the presence of nearby objects without any physical contact. The sensor assembly 1014 may also include a light sensor, such as a Complementary Metal-Oxide-Semiconductor (CMOS) or Charged Coupled Device (CCD) image sensor, for use in imaging applications. In some embodiments, the sensor component 1014 may further include an acceleration sensor, a gyro sensor, a magnetic sensor, a pressure sensor, or a temperature sensor.

The communication component 1016 is configured to facilitate wired or wireless communication between the device 1000 and other devices. The device 1000 may access a wireless network based on a communication standard, such as Wi-Fi, 2G, 3G, or a combination thereof. In an example, the communication component 1016 receives broadcast signals or broadcast related information from an external broadcast management system via a broadcast channel. In one example, the communication component 1016 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the device 1000 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronic components for performing the above methods.

In an example, there is also provided a non-transitory computer-readable storage medium including instructions, such as the memory 1004 including instructions executable by the processor 1020 of the device 1000 to implement the above method. For example, the non-transitory computer-readable storage medium may be a ROM, a random access memory (RAM), a CD-ROM, a magnetic tape, a floppy disk, and an optical data storage device.

Since the apparatus embodiments essentially correspond to the method embodiments, reference may be made to the description of related parts of the method embodiments. The apparatus embodiments described above are merely illustrative, wherein the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the elements.

Other implementations of the present disclosure will be readily apparent to those skilled in the art after implementing the disclosure by referring to the specification. The present application is intended to cover any variations, uses, or adaptations of the present disclosure which are in accordance with the general principles of the present disclosure and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures shown in the drawings, and various modifications and changes can be made to the present disclosure without departing from the scope thereof. The scope of the present disclosure is to be limited only by the appended claims.

The invention claimed is:

1. A method of performing integrity verification on downlink data of a data radio bearer (DRB) and reporting information, the method comprising:
receiving, by user equipment (UE), the downlink data of the DRB enabled with an integrity protection function and performing an integrity verification on the downlink data of the DRB;
receiving, by the UE, first configuration information sent by a base station, wherein the first configuration information comprises an identifier of the DRB that is capable of triggering the integrity-verification-failure-related-information reporting; and
triggering, by the UE, an integrity-verification-failure-related-information reporting based on the first configuration information in response to that the integrity verification fails, wherein the integrity-verification-failure-related-information comprises one or more of parameters: location information of the UE, a failure indication type of Integrity VerificationFailure, indication information of a triggering way to trigger the integrity-verification-failure-related-information reporting, and a number of integrity verification failures.

2. The method according to claim 1, wherein the triggering the integrity-verification-failure-related-information reporting comprises one or more of:
triggering the integrity-verification-failure-related-information reporting in response to that the number of integrity verification failures of the UE reaches a first preset number;
triggering the integrity-verification-failure-related-information reporting in response to that the number of integrity verification failures for the same DRB reaches a second preset number;
triggering the integrity-verification-failure-related-information reporting in response to that the number of integrity verification failures of the UE reaches a third preset number within a first preset duration; and
triggering the integrity-verification-failure-related-information reporting in response to that the number of integrity verification failures for the same DRB reaches a fourth preset number within a second preset duration.

3. The method according to claim 2, wherein
the first preset number is configured by the base station or negotiated through a current system;
the second preset number is configured by the base station or negotiated through the current system, or the second preset number is configured for each UE or for each DRB;
the third preset number and the first preset duration are configured by the base station or negotiated through the current system, or the third preset number and the first preset duration are configured for each UE; and
the fourth preset number and the second preset duration are configured by the base station or negotiated through the current system, or the fourth preset number and the second preset duration are configured for each UE or for each DRB.

4. The method according to claim 1, further comprising:
starting a preset suppression timer once reporting the integrity-verification-failure-related-information;
suppressing the integrity-verification-failure-related-information from being reported until the suppression timer expires; and
enabling the integrity-verification-failure-related-information to be reported in response to that the suppression timer expires.

5. The method according to claim 4, wherein the suppression timer is configured by the base station or negotiated through a current system.

6. The method according to claim 1, further comprising:
receiving a second configuration information sent by the base station; and
for a DRB configured with the integrity protection function, enabling the integrity protection function of the DRB based on the second configuration information.

7. A user equipment, comprising:
a processor; and
a memory for storing executable instructions by the processor;
wherein the processor is configured to:
receive downlink data of a data radio bearer (DRB) enabled with an integrity protection function and perform an integrity verification on the downlink data of the DRB;
receive first configuration information sent by a base station, wherein the first configuration information comprises an identifier of the DRB that is capable of triggering the integrity-verification-failure-related-information reporting; and
trigger an integrity-verification-failure-related-information reporting based on the first configuration information in response to that the integrity verification fails, wherein the integrity-verification-failure-related-information comprises one or more of parameters: location information of the UE, a failure indication type of Integrity VerificationFailure, indication information of a triggering way to trigger the integrity-verification-failure-related-information reporting, and a number of integrity verification failures.

8. The user equipment according to claim 7, wherein when triggering the integrity-verification-failure-related-information reporting, the processor is configured to comprise one or more of:
trigger the integrity-verification-failure-related-information reporting in response to that the number of integrity verification failures of the UE reaches a first preset number;
trigger the integrity-verification-failure-related-information reporting in response to that the number of integrity verification failures for the same DRB reaches a second preset number;
trigger the integrity-verification-failure-related-information reporting in response to that the number of integrity verification failures of the UE reaches a third preset number within a first preset duration; and
trigger the integrity-verification-failure-related-information reporting in response to that the number of integrity verification failures for the same DRB reaches a fourth preset number within a second preset duration.

9. The user equipment according to claim 8, wherein
the first preset number is configured by the base station or negotiated through a current system;
the second preset number is configured by the base station or negotiated through the current system, or the second preset number is configured for each UE or for each DRB;

the third preset number and the first preset duration are configured by the base station or negotiated through the current system, or the third preset number and the first preset duration are configured for each UE; and the fourth preset number and the second preset duration are configured by the base station or negotiated through the current system, or the fourth preset number and the second preset duration are configured for each UE or for each DRB.

10. The user equipment according to claim 7, wherein the processor is further configured to:

start a preset suppression timer once reporting the integrity-verification-failure-related-information;

suppress the integrity-verification-failure-related-information from being reported until the suppression timer expires; and enable the integrity-verification-failure-related-information to be reported in response to that the suppression timer expires.

11. The user equipment according to claim 10, wherein the suppression timer is configured by the base station or negotiated through a current system.

12. The user equipment according to claim 7, wherein the processor is further configured to:

receive a second configuration information sent by the base station; and for a DRB configured with the integrity protection function, enable the integrity protection function of the DRB based on the second configuration information.

13. A non-transitory computer-readable storage medium having computer instructions stored thereon, when the instructions are executed, a processor is configured to perform acts comprising:

receiving downlink data of a data radio bearer (DRB) enabled with an integrity protection function and performing an integrity verification on the downlink data of the DRB;

receiving first configuration information sent by a base station, wherein the first configuration information comprises an identifier of the DRB that is capable of triggering the integrity-verification-failure-related-information reporting; and triggering an integrity-verification-failure-related-information reporting based on the first configuration information in response to that the integrity verification fails, wherein the integrity-verification-failure-related-information comprises one or more of parameters: location information of a user equipment, a failure indication type of Integrity VerificationFailure, indication information of a triggering way to trigger the integrity-verification-failure-related-information reporting, and a number of integrity verification failures.

* * * * *